United States Patent Office 3,394,108
Patented July 23, 1968

3,394,108
POLYMER AND α-ALANINE DERIVED FROM ACETALDEHYDE CYANOHYDRIN AND HYDROGEN CYANIDE
Shinichi Ishida, Tokyo, and Joji Ibata, Musashino-shi, Japan, assignors to Asahi Kasei Kogyo Kabushiki Kaisha, Kita-ku, Osaka, Japan, a corporation of Japan
No Drawing. Filed Apr. 1, 1965, Ser. No. 444,809
Claims priority, application Japan, Apr. 3, 1964, 39/18,524
16 Claims. (Cl. 260—67)

ABSTRACT OF THE DISCLOSURE

An amorphous polymer containing (—CO—CHCH$_3$—NH—)

and (—CHCH$_3$—CO—NH—CHCH$_3$—O—) as structural units is produced by reacting acetaldehyde cyanohydrin or acetaldehyde and hydrogen cyanide with an inorganic acid at a temperature of —100° C. to 60° C., preferably in an anhydrous inert medium. The polymeric products are useful as wetting agents, surfactants, detergents, treating agents of fiber and paper, anti-electrostatics, viscosity thickeners, additives to cosmetics, paints, foods and adhesives.

---

This invention relates to a method for producing a novel polymer containing alanyl units in the main chain from acetaldehyde cyanohydrin and for readily and economically producing alpha-alanine by hydrolysing the polymer so produced.

An object of the present invention is to provide a method for readily producing a useful, novel polymer and for economically producing alanine.

As for attempts at obtaining polymers from cyanohydrine, there is, for example, a description in German Patent 1,108,430. According to this description, the reaction of ethylene cyanohydrin or acetone cyanohydrin with a small amount of alkali metal, alkali earth metal, halogen, heavy metal halide or the like under a pressure of 30 to 250 atmospheres, at a high temperature of about 200° C. produces a resinous product having an amide bond.

Acetaldehyde cyanohydrin is a quite unstable substance which is readily decomposed by heating. Further, there is a dissociation equilibrium in this substance, between acetaldehyde and hydrogen cyanide at room temperature. Since hydrogen cyanide and acetaldehyde are both readily changed into other substances in the presence of a base, it is extremely difficult to apply the abovementioned method to acetaldehyde cyanohydrin. There is no description in this patent as to acetaldehyde cyanohydrin.

Besides, there has never been found any publication on the production of a polymer from acetaldehyde cyanohydrin.

The present inventors have now discovered that acetaldehyde cyanohydrin is polymerized at a low temperature in the presence of an inorganic acid, e.g., hydrochloric acid and changed into a novel polymer containing a polyamide bond. Furthermore, it has been found that this reaction is unique to acetaldehyde cyanohydrin and does not occur in the case of acetone cyanohydrin, alpha omega-alkylene cyanohydrin or other cyanohydrins. In other words, the reaction of hydrogen chloride with aliphatic or aromatic cyanohydrin other than acetaldehyde cyanohydrins or ketocyanohydrins, e.g., benzaldehyde or acetone cyanohydrin gives oxazolid-4-one having substituents in the 2,5-, 2,2- or 5,5-positions. In this instance, resinous substances as above-mentioned are not obtained.

The resulting oxazolid-4-one can not be polymerized by acids.

According to embodiments of the present invention, an almost colorless resinous polymer is obtained from acetaldehyde cyanohydrin or a mixture of acetaldehyde and hydrogen cyanide in the presence of acidic compounds, particularly inorganic acids at a temperature from —100° C. to 60° C., preferably —80° C. to 30° C. The composition of the polymer varies depending upon the reaction conditions, particularly the reaction temperature and from polyalanine type polymer to polyalanyl type polymer containing ether bonds.

The inorganic acids effective in the present invention include hydrogen halides, e.g. hydrogen chloride, hydrogen fluoride and hydrogen bromide; sulfuric acid, nitric acid, sulfurous acid, phosphorous acid, phosphoric acid, thiosulfuric acid, pyrophosphoric acid, polyphosphoric acid, iodic acid and chlorous acid. Above all, hydrogen chloride and sulfuric acid are most convenient and effective.

There is no limitation as to the amount of acid used, but 0.1 to 5 mol equivalent, especially 0.5 to 2 mol equivalent per mol equivalent of acetaldehyde cyanohydrin is preferable.

The reaction is carried out with or without a solvent medium under anhydrous conditions, or in the presence of a small amount of water.

As solvents, organic solvents which are inert to the reactants and the acid at the reaction conditions are useful.

One or more solvents selected from the group consisting of ethers such as dimethylether, dimethoxyethane, tetrahydrofuran, dioxan, diethyleneglycol dimethylether, ethyleneglycol monomethylether, ethyleneglycol diethylether, diethyleneglycol monoethylether diethyleneglycol dibenzylether, anisole, lower aliphatic nitriles such as acetonitrile and propionitrile, lower carboxylic acid esters such as methyl acetate, ethyl acetate, and methyl propionate, nitroparaffins such as nitromethane, nitroethane, nitropropane, and nitrobenzene, lower chlorinated hydrocarbons such as methylene chloride and ethylene dichloride are useful.

The products obtained according to the present invention were found to be novel polymeric substance from the following evidence, i.e., the solution viscosity, the solubilization behavior, the melting behavior, X-ray analysis, IR analysis and elemental analysis.

It was found that the polymers contain the following two sequences;

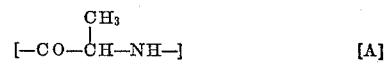    [A]

and

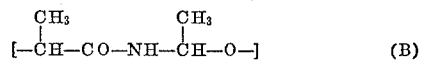    (B)

in a variable ratio in the polymer chain depending upon the reaction conditions. The formation of bonding of these units always takes place in one direction from the point of view of reaction mechanism. Therefore, no bonds except amide and ether bonds could be observed.

The infrared spectra of the products of this invention coincide with that of DL-polyalanine produced by polymerizing N-carboxylic anhydride of DL-alanine with the use of tri-n-butyl amine as catalyst, although the absorption bands at 1175 cm.$^{-1}$ and 970 cm.$^{-1}$ contributing to the configurational structure are not observed and an ether band which does not exist in poly-DL-alanine appears at 1130 cm.$^{-1}$.

It is believed that the polymer of the present invention has in general, these two structures in the chain. The structure of sequence (A) may be considered to be that of polyalanine and that of (B) may be considered to be that of a ring-opened polymer of oxazolid-4-one. The sequence (A) may be considered to be obtained by the de-aldehyde reaction in the supposed ring-opening polymerization of oxazolid-4-one.

The proportion of the two sequences depends mainly on the polymerization temperature. The sequence (A) is favored by a higher temperature and the sequence (B) is favored by a lower temperature. This proportion can be determined by elemental analysis and infra-red absorption spectra.

Polymers having various compositions of from 12.2% to 19.7% by weight of nitrogen content in the total polymer are obtained.

If the mole fraction of the sequence (A) and that of the sequence (B) are $f$ and $(1-f)$ respectively, the following relationship between nitrogen content (%) N and $f$ is observed;

$$N = \frac{14.01}{115.14 - 44.06f}$$

The mole fraction $f$ is the mole fraction of alanyl unit in the total polymer. Although this composition depends upon the polymerization temperature at a given condition, it also varies according to the kind of acids used.

The presence of a small amount of water also influences the yield and the composition of polymers but not substantially. The reaction in the presence of large amount of water or in an aqueous solution is not successful because of side reactions: The reaction is carried out preferably using dried hydrogen chloride in an organic solvent but it is also possible in the presence of small amounts of moisture.

The polymer products as produced are colorless or pale yellowish resinous material ranging from paste to tacky form but they are purified by reprecipitation from a solution in the form of powder or flakes. The purified polymers possess different properties according to the composition. It is possible to produce various kinds of polymers ranging from water-soluble type to insoluble type. In all cases they are insoluble in ethers and acetone but soluble in lower alcohols such as methanol and ethanol.

These polymers melt at a temperature between 230° and 280° C. in a sealed tube without decomposition and the melting point changes with changing reaction conditions, i.e., with the composition of the polymer.

The polymerization requires in general more than 2 hours and the polymer yield is 50 to 90 weight percent based upon the weight of cyanohydrin.

The products of this invention are applicable to a wide range of use, utilizing the physical properties, that is as, wetting agents, surfactants, detergents, treating agents of fiber and paper, anti-electrostatics, viscosity thickeners, additives to cosmetics, paints, food and adhesives.

The present invention also includes a novel method of synthesis of alpha-DL-alanine.

The polymer products of this invention contain alanyl units of which the amount corresponds to the above-mentioned $f$ in the chain.

Hydrolysis of the polymers obtained in the present process is carried out under heating in the presence of an inorganic acid and water according to the common method of hydrolysis of a protein. Alpha-DL-alanine can be isolated and purified by the usual methods.

Compared with the Strecker aminoacid synthesis in which acetaldehyde, hydrogen cyanide and ammonia are used as raw materials, the present method is much more advantageous in economy and operation, that is, no use of ammonia as raw material, simplicity and ease of the reaction and inexpensiveness of the apparatus.

Example 1

Thirty ml. of anhydrous diethyl ether and 12 g. of acetaldehyde cyanohydrin were charged in a flask equipped with a stirrer, a reflux condenser and a gas inlet tube and cooled to −78° C. in a Dry Ice-acetone bath and gaseous, anhydrous hydrogen chloride was introduced therein with stirring.

The external cooling was discontinued and by gentle warming, the reaction solution was brought to room temperature over about 30 minutes. With continuous warming, anhydrous hydrogen chloride was introduced under stirring at a temperature of 34° C. for 3 hours. The total introduction of anhydrous HCl was 30 g. Thus about 16 g. of brownish colored paste was produced in the flask. The reprecipitation of this substance by adding diethyl ether gave 8 g. of faintly yellowish paste. Infrared spectra of the product showed two strong absorption bands at 1680 cm.$^{-1}$ and 1530 cm.$^{-1}$ corresponding to amide I and amide II, respectively, but there was no absorption at the nitrile band region and the hydroxy band region. The product was found to be amorphous by X-ray analysis.

The product thus obtained was dissolved in 10 cc. of conc. hydrochloric acid and after refluxing for about 2 hours at a temperature of 100° C., a further 4 cc. of conc. hydrochloric acid was added to the solution and the mixture was heated for about 5 hours at 130° to 140° C. in a sealed tube. After completion of the reaction, the reaction solution was distilled. After addition of about 15 cc. of water the resulting solution was passed through an ion exchange resin column (Amberlite IRA–410, Rohm & Haas Co.). 4.4 g. of alpha-DL alanine was obtained by concentration, purification and recrystallization of the product.

Example 2

Six g. of acetaldehyde cyanohydrin and 20 ml. of anhydrous diethyl ether were charged in a 50 cc. ampoule. Under external cooling at 78° C., 6.5 g. of anhydrous, gaseous hydrogen chloride corresponding to about 2 mol equivalent of the cyanohydrin was absorbed therein. After sealing the ampoule, followed by gentle warming, the reaction was carried out at a temperature of −15° C. for about 30 hours.

The reaction solution turned yellowish and a water soluble white resinous material was produced in the bottom of the vessel. This product was taken out and dissolved in water. The resulting solution was passed through a column filled with Amberlite IRA–410 (Rohm & Haas Co.) and then evaporated upon the water whereby 6.5 g. of a tacky mass was obtained.

This substance, dissolved in methanol, reprecipitated from diethylether yielded about 4.1 g. of a colorless hygroscopic substance which corresponds to 70 percent yield based on the weight of cyanohydrin used. The specific viscosity of the resulting product (0.1 g. in 100 ml. of water at 25° C.) was 0.05. It was observed from infrared spectrum that there exists amide I and II bands at 1680 cm.$^{-1}$ and 1530 cm.$^{-1}$ respectively and an ether absorption band at about 1130 cm.$^{-1}$. The result of elemental analysis was as follows:

Calculated for poly-DL alanine: C, 50.69%; H, 7.09%; N, 19.71%. Found: C, 48.21%; H, 7.21%; N, 18.07%.

The product melts at 238°–245° C. in a sealed capillary without decomposition and was hygroscopic. The product was found to be amorphous by X-ray analysis. The above-mentioned polymer, hydrolysed with hydrochloric acid yielded pure DL-alanine crystal with a yield of about 60 percent.

Example 3

Three ml. of conc. sulfuric acid was added at a temperature of −78° C. to 6 g. of acetaldehyde cyanohydrin dissolved in 20 ml. of diethylether and allowed to react at a temperature of −15° C. as in Example 2, and about 2 g. of resinous product was obtained in about 24 hours. By the procedure of Example 2, there was obtained a yellowish water-insoluble and non-hygroscopic powder. The infrared spectra of this powder did not show much difference from that in Example 2, but the polymer melts at near 275° C., although the polymers produced with the use of HCl melts at 230°–250° C.

The formation of alpha-alanine was confirmed by hydrolysis as in prior examples.

Example 4

Samples of 12 g. of anhydrous hydrogen chloride were introduced into each of five solutions of 6 g. of acetaldehyde cyanohydrin dissolved in 20 ml. of diethylether in separate reaction vessels and the reactions were carried out at the following temperatures for 30 hours. The products were worked up as in Example 2. From the elemental analyses, the percentage of alanyl unit in the polymer was calculated. It was found that the value thereof decreases as the reaction temperature is decreased. By actual hydrolysis, the yields of alanine were determined, and the results of these experiments are given below in the table.

TABLE

| | Reaction temperature, °C. | Polymer yield, g. | N, percent | Calculated alanyl unit in polymer | | Observed alanyl unit in polymer weight, percent |
|---|---|---|---|---|---|---|
| | | | | Mole, percent | Weight, percent | |
| No.: | | | | | | |
| 1 | −78 | 5.1 | 12.52 | 7.3 | 4.3 | |
| 2 | −50 | 4.3 | 12.73 | 11.5 | 7.4 | |
| 3 | −30 | 4.3 | 16.51 | 68.7 | 57.5 | 50.1 |
| 4 | −10 | 4.2 | 18.01 | 84.7 | 77.35 | 72.0 |
| 5 | 0 | 3.5 | 18.21 | 86.7 | 80.10 | 79.1 |
| Calculated for polyalpha alanine | | | 19.71 | 100.0 | 100.0 | |
| Calculated for poly-(2,5-dimethyloxazolidone-4) | | | 12.19 | 0.0 | 0.0 | |

Example 5

Four g. of hydrogen cyanide were added to a mixture of 20 ml. of acetonitrile and 5 g. of acetaldehyde at a temperature of −20° C. and 6 g. of anhydrous hydrogen chloride were added so as to be absorbed therein at a temperature of −78° C. with stirring. The mixture was allowed to stand and after 40 hours a paste product was obtained. This product, isolated and purified by recrystallization from methanol gave 3.1 g. of a powder. This powder had a nitrogen content of 13.2 percent by weight. It was also confirmed from infrared analysis that it contained amide and ether units.

Example 6

Three ml. of phosphoric acid were slowly added under vigorous agitation to 6 g. of acetaldehyde cyanohydrin dissolved in 20 ml. of dioxane and cooled at −78° C. The reaction was continued for another hour and then the cooling was discontinued. 7 g. of a resinous product (which was not completely dried) was obtained after the mixture was slowly warmed to room temperature and allowed to stand for 24 hours. This product was treated with an anion exchanger Amberlite IRA–410 and purified whereby 2.8 g. of a polymer similar to that of Example 1 was obtained. The nitrogen content of the purified product was 15.2 percent.

Example 7

Two g. of nitric acid were added to 6 g. of acetaldehyde cyanohydrin dissolved in 20 ml. of dried methylenechloride and cooled at a temperature of −78° C. After sealing the vessel followed by agitation, the temperature of the mixture was slowly elevated to room temperature. The reaction was continued for 24 hours and thereafter the vessel was opened. By the treatment as in Example 2, 1.1 g. of polymer were obtained.

Example 8

To 6. g. of acetaldehyde cyanohydrin cooled at −78° C. in a vessel, anhydrous hydrogen chloride diluted with nitrogen was introduced slowly with stirring. After the introduction of 6 g. of hydrogen chloride over 3 hours, 30 ml. of diethylether cooled at −78° C. was poured into the resultant mixture. A brownish paste was isolated from the reaction mixture and dissolved in methanol and reprecipitated in diethylether to give 2.6 g. of yellow powder which was quite hydroscopic and found to contain 12.3% by weight of nitrogen. The presence of amide and ether bonds were verified by infrared spectra.

What is claimed is:

1. An amorphous polymer consisting essentially of the following structural units:

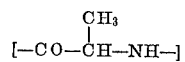

and

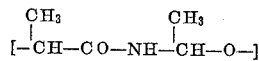

and having a nitrogen content of 12.2% to 19.7% by weight, and a melting point of 230° C. to 280° C.

2. A process for producing a polymer consisting essentially of the following structural units:

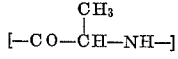

and

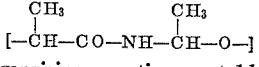

said process comprising reacting acetaldehyde cyanohydrin in the presence of an inorganic acid at a temperature between −100° C. and 60° C.

3. A process according to claim 2, wherein the inorganic acid is selected from the group consisting of hydrogen chloride, hydrogen fluoride, hydrogen bromide, surfuric acid, nitric acid, sulfurous acid, phosphorous acid, phosphoric acid, thiosulfuric acid, pyrophosphoric acid, polyphosphoric acid, iodic acid and chlorous acid.

4. A process according to claim 2, wherein the reaction is effected in an inert organic medium.

5. A process according to claim 4, wherein the inert organic medium is selected from the group consisting of ethers, lower aliphatic nitriles, lower carboxylic acid esters, nitroparaffins and chlorinated lower hydrocarbons.

6. A process according to claim 2, wherein the reaction is effected in an inert organic medium under anhydrous conditions.

7. A process for producing a polymer consisting essentially of the following structural units:

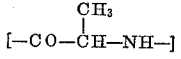

and

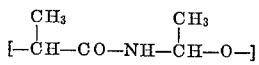

said process comprising reacting acetaldehyde and hydrogen cyanide in the presence of an inorganic acid at a temperature between −100° C. and 60° C.

8. A process according to claim 7, wherein the inorganic acid is selected from the group consisting of hydrogen chloride, hydrogen bromide, hydrogen fluoride, sulfuric acid, nitric acid, sulfurous acid, phosphorous acid, phosphoric acid, thiosulfuric acid, pyrophosphoric acid, polyphosphoric acid, iodic acid and chlorous acid.

9. A process according to claim 7, wherein the reaction is effected in an inert organic medium.

10. A process according to claim 9, wherein the inert organic medium is selected from the group consisting of ethers, lower aliphatic nitriles, lower carboxylic acid esters, nitroparaffins and chlorinated lower hydrocarbons.

11. A process according to claim 7, wherein the reaction is effected in an inert organic medium under anhydrous conditions.

12. A process according to claim 2, wherein the reaction is carried out in the absence of a solvent medium.

13. A process for producing alpha-alanine which comprises reacting acetaldehyde cyanohydrin in the presence of an inorganic acid at a temperature between —100° C. and 60° C. to produce a polymer and hydrolyzing said polymer.

14. A process for producing alpha-alanine which comprises reacting acetaldehyde cyanohydrin in an inert organic solvent in the presence of an inorganic acid under anhydrous conditions at a temperature between —80° C. and 30° C. to produce a polymer and hydrolyzing said polymer.

15. A process for producing alpha-alanine which comprises reacting acetaldehyde with hydrogen cyanide in the presence of an inorganic acid at a temperature between —100° C. and 60° C. to produce a polymer and hydrolyzing said polymer.

16. A process for producing alpha-alanine which comprises reacting acetaldehyde with hydrogen cyanide in an inert organic solvent in the presence of an inorganic acid under anhydrous conditions at a temperature between —80° C. and 30° C. to produce a polymer and hydrolyzing said polymer.

References Cited

UNITED STATES PATENTS 2,778,811   1/1957   Ullrich _____ 260—67

FOREIGN PATENTS 1,174,303   7/1964   Germany.

OTHER REFERENCES

Noller, Chemistry of Organic Compounds (W. B. Saunders Co., Philadelphia, Pa.) 2nd ed. (1957), pp. 144, 246, 252 and 253.

Tsuruta et al., Die Makromolekulare Chemie, vol. 63 (May 1963), pp. 219–221.

WILLIAM H. SHORT, *Primary Examiner.*

L. M. PHYNES, *Assistant Examiner.*